(12) United States Patent
Kitagawa et al.

(10) Patent No.: US 6,403,259 B1
(45) Date of Patent: Jun. 11, 2002

(54) NONAQUEOUS ELECTROLYTE SECONDARY BATTERY COMPRISING CARBON PARTICLES WITH A PLURAL-LAYER STRUCTURE

(75) Inventors: Masaki Kitagawa, Katano; Hizuru Koshina, Neyagawa; Toyoji Sugimoto, Fujiidera; Shoji Yamaguchi, Tsuchiura; Manabu Hayashi, Miho-mura, all of (JP)

(73) Assignees: Matsushita Electric Industrial Co., Ltd., Osaka; Mitsubishi Chemical Corporation, Tokyo, both of (JP)

(*) Notice: Subject to any disclaimer, the term of this patent is extended or adjusted under 35 U.S.C. 154(b) by 0 days.

(21) Appl. No.: 09/214,818
(22) PCT Filed: May 29, 1998
(86) PCT No.: PCT/JP98/02400
  § 371 (c)(1),
  (2), (4) Date: Feb. 22, 1999
(87) PCT Pub. No.: WO98/54779
  PCT Pub. Date: Dec. 3, 1998

(30) Foreign Application Priority Data

May 30, 1997 (JP) .............................................. 9-141920

(51) Int. Cl.$^7$ ................................................ H01M 4/60
(52) U.S. Cl. .................................. 429/231.4; 429/231.8
(58) Field of Search ............................ 429/231.4, 197, 429/218, 231.8, 231.9, 331.95, 217

(56) References Cited

U.S. PATENT DOCUMENTS

| | | | |
|---|---|---|---|
| 5,244,757 A | | 9/1993 | Takami et al. |
| 5,294,498 A | | 3/1994 | Omaru et al. |
| 5,686,138 A | * | 11/1997 | Fujimoto ..................... 429/197 |
| 5,756,062 A | | 5/1998 | Greinke et al. |
| 5,882,818 A | * | 3/1999 | Fujimoto ..................... 429/197 |
| 5,908,715 A | * | 6/1999 | Liu ............................. 429/217 |
| 5,951,959 A | * | 9/1999 | Nishimura ............... 423/447.1 |
| 6,156,432 A | * | 12/2000 | Malbuchi .................... 428/408 |

FOREIGN PATENT DOCUMENTS

| | | |
|---|---|---|
| JP | 5-74452 | 3/1993 |
| JP | 5-307959 | 11/1993 |
| JP | 6-168724 | 6/1994 |
| JP | 6-295725 | 10/1994 |
| JP | 7-134988 | 5/1995 |
| JP | 7-335216 | 12/1995 |
| JP | 8-213020 | 8/1996 |
| JP | 9-180720 | 7/1997 |
| JP | 9-199126 | 7/1997 |

* cited by examiner

Primary Examiner—Gabrielle Brouillette
Assistant Examiner—Mark Ruthkosky
(74) Attorney, Agent, or Firm—Jordan and Hamburg LLP

(57) ABSTRACT

Enhancement of the storage property at a high temperature and discharge characteristics at a low temperature of a nonaqueous electrolyte secondary cell is intended. A negative electrode material which is prepared by covering the surface of a nucleus made of a graphite powder with a carbonaceous matter, the graphite powder having a specified plane interval, spectrum value, mean particle size, specific surface area, tapping density, and (110)/(004) X-ray peak intensity ratio, is used in the nonaqueous electrolyte secondary cell.

8 Claims, 1 Drawing Sheet

NONAQUEOUS ELECTROLYTE SECONDARY BATTERY COMPRISING CARBON PARTICLES WITH A PLURAL-LAYER STRUCTURE

TECHNICAL FIELD

The present invention relates to a nonaqueous electrolyte secondary cell, and more particularly to a carbon material for a negative electrode of a lithium ion secondary cell.

BACKGROUND ART

A nonaqueous electrolyte secondary cell, or the so-called lithium secondary cell, has been previously studied in the interest of obtaining higher energy density, by achieving a higher voltage and a larger capacity. This secondary cell uses lithium metal as an active material in the negative electrode, and an oxide, sulfide, selenide or other chalcogen compound of transition metals, such as manganese dioxide, molybdenum disulfide or titanium selenide, as an active material in the positive electrode. The nonaqueous electrolyte is an organic electrolyte, made of an organic solvent solution of lithium salt. In this lithium secondary cell, however, while an interlayer compound which exhibits relatively good charge and discharge characteristics may be selected as a positive electrode active material, the charge and discharge characteristics of metal lithium for a negative electrode are not particularly favorable.

Thus, the cycle life for repeated charge and discharge can hardly be extended. Moreover, there is a danger that an internal short circuit may generate heat, presenting a safety problem. More specifically, the lithium metal in the negative electrode can elute into the organic electrolyte as lithium ions. electrode as metal lithium by charge, not all of them precipitate smoothly as in the initial state, but some precipitate as active metal crystals in the form of dendrite or moss. The active metal crystals decompose the organic solvent in the electrolyte, while the surface of the metal crystals is covered with a passive film to be inactivated, hardly contributing to discharge. As a result, as charge and discharge cycles are repeated, the negative electrode capacity declines, wherefore the negative electrode capacity had to be set extremely larger than that of the positive electrode when fabricating a cell. Besides, the active dendritic metal lithium crystals may pierce through the separator and contact with the positive electrode, possibly causing internal short-circuit. By internal short-circuit, the cell may generate heat.

Accordingly, the so-called lithium secondary cell, which uses a carbon material as the negative electrode material, has been proposed. This latter cell is capable of reversibly undergoing repeated intercalation and deintercalation with each charge and discharge, and it is now being intensively researched and developed, and it is already in actual use. In this lithium secondary cell, so far as it is not overcharged, active dendritic metal lithium crystals do not precipitate on the negative electrode surface when the cell is charging up and discharging, and enhancement of safety is much expected. Moreover, since this battery is extremely superior in high rate charge and discharge characteristics and cycle life to the lithium secondary cell using metal lithium in the negative electrode active material, the demand for this battery is growing rapidly in recent years.

As the positive electrode active material for lithium ion secondary cell of 4V class, a composite oxide of lithium and transition metal, such as $LiCoO_2$, $LiNiO_2$, $LiMnO_2$, and $LiMn_2O_4$, corresponding to the discharge state is being employed or considered. As the electrolyte, similarly as in the lithium secondary cell, a nonaqueous electrolyte such as organic electrolyte and polymer solid electrolyte is used.

When graphite is used in the negative electrode material, the theoretical value of capacity per 1 g of carbon by reference to $C_6Li$ of interlayer compound produced by intercalation of lithium ion is 372 mAh. Therefore, among various carbon materials, the one which helps realize a specific capacity close to this theoretical value, as well as causes the capacity per unit volume, i.e., capacity density (mAh/cc) to be as high as possible, should be selected for the negative electrode that is put in practical use.

Among various carbon materials, in the hardly graphitized carbon generally known as hard carbon, materials which exhibit a specific capacity exceeding the above mentioned theoretical value (372 mAh/g) are discovered and are being investigated. However, since the hardly graphitized amorphous carbon is small in true specific gravity and is bulky, it is substantially difficult to increase the capacity density per unit volume of the negative electrode. Furthermore, there still remain many problems, for example, the negative electrode potential after charge is not so base as to be close to the metal lithium potential, and flatness of discharge potential is inferior.

By contrast, when natural graphite or artificial graphite powder which is high in crystallinity is used in the negative electrode, the potential after charge is close to the metal lithium potential, and the flatness of discharge potential is excellent, whereby the charge and discharge characteristics are enhanced as a practical battery, and thus the graphite powder is recently becoming the mainstream of negative electrode material.

However, when the mean particle size of the graphite powder for negative electrode of a lithium ion secondary cell is large, the charge and discharge characteristics at high rate and discharge characteristic at low temperature tend to be inferior. Accordingly, by reducing the mean particle size of the powder, the high rate charge and discharge characteristics and low temperature discharge characteristic are enhanced, but if the mean particle size is made too small, the specific surface area of the powder becomes too large, as a result of which there is a problem of increased irreversible capacity, in which the lithium inserted by first charge in the powder cannot contribute to discharge after the first cycle. This phenomenon is not only a fatal demerit for enhancement of energy density, but also causes the solvent in the organic electrolyte to be decomposed in case the battery is left at a high temperature exceeding 100° C., which may lead to self-discharge as well as an electrolyte leak accident due to raise in the cell internal pressure, thereby lowering the reliability of the battery.

It is hence easily understood that the appropriate specific surface area and mean particle size are essential for the graphite powder for negative electrode. An invention proposed from such viewpoint is, for example, Japanese Laid-open Patent No. 6-295725, which uses graphite powder of which specific surface area by BET method is 1 to 10 m²/g, mean particle size is 10 to 30 microns, and at least one of the content of powder with a particle size of 10 microns or less and the content of powder with a particle size of 30 microns or more is 10% or less. Further, in Japanese Laid-open Patent No. 7-134988, the usage of spherical graphite powder is disclosed, which is obtained by graphitizing meso-carbon micro-beads formed by heating petroleum pitch at a low temperature and of which plane interval (d002) of (002) plane by wide angle X-ray diffraction method is 3.36 to 3.40 angstroms, and specific surface area by BET method is 0.7 to 5.0 m²/g. Further, Japanese Laid-open Patent No. 5-307959 discloses the use of a multi-phase carbon matter having a specific surface area that is 20 m²/g or less as well as less than half of the specific surface area of a nucleus of carbon matter.

These inventions were not only extremely effective for enhancement of high rate charge and discharge characteristics and discharge characteristic at low temperature of the lithium ion secondary cell, but also effective for decreasing the irreversible capacity determined in the initial phase of cycle, which was a fatal problem to be solved. However, such problems are still left that storage property and reliability when left at a high temperature are not sufficiently achieved, and the specific capacity (mAh/g) and capacity density (mAh/cc) of the negative electrode are not satisfactory.

It is thus an object of the invention to improve further the reliability and high energy density of a lithium secondary cell.

DISCLOSURE OF INVENTION

To solve the aforesaid problems of the lithium ion secondary cell, according to the present invention, a carbonaceous powder of plural-layer structure with a surface layer of carbonaceous matter formed therein is used as a negative electrode material, said carbonaceous powder being prepared such that, using alumpy graphite powder as a nucleus, this nucleus or the graphite powder is covered with a carbon precursor, which is then fired in an inert gas atmosphere at a temperature within the range of 700 to 2800° C., thereby causing the surface layer of the carbonaceous matter to form, wherein said lumpy graphite powder has the following characteristics:

(1) the plane interval (d002) of (002) plane by wide angle X-ray diffraction method is less than 3.37 angstroms, and the size (Lc) of crystallite in a C-axis direction is at least 1000 angstroms or more, (2) R value, that is the peak intensity ratio of 1360 cm⁻¹ in relation to the peak intensity of 1580 cm⁻¹ in the argon ion laser Raman spectrum, is 0.3 or less, and the half width of 1580 cm⁻¹ peak is 24 cm⁻¹ or less, (3) the mean particle size is 10 to 30 microns, and the thickness of the thinnest portion is at least 3 microns or more and not exceeding the mean particle size, (4) the specific surface area by BET method is 3.5 m²/g or more and not exceeding 10.0 m²/g, (5) the tapping density is 0.5 g/cc or more and not exceeding 1.0 g/cc, and (6) the X-ray diffraction peak intensity ratio of (110)/(004) by wide angle X-ray diffraction method is 0.015 or more; whereby a nonaqueous electrolyte secondary cell of high specific capacity is realized, wherein the irreversible capacity noted in the initial cycle is made as small as possible, the storage property and reliability of the battery when left at a high temperature are enhanced, and excellent high rate discharge characteristic and discharge characteristic at a low temperature are achieved.

BEST MODES FOR CARRYING OUT THE INVENTION

Figure 1:
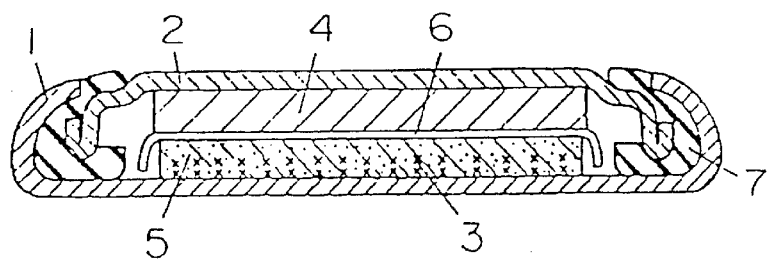
FIG. 1 is a sectional view of a coin type cell for measuring the reversible capacity and irreversible capacity for studying the effects achieved by the present invention.

The present invention as set forth in claim 1 relates to a nonaqueous electrolyte secondary cell comprising a positive electrode, a negative electrode, and a separator interposed therebetween, said negative electrode being made of a negative electrode material which allows lithium ions to repeat intercalation and deintercalation reversibly by charge and discharge, wherein a carbonaceous powder of plural-layer structure with a surface layer of carbonaceous matter formed (1) the plane interval (d002) of (002) plane by wide angle X-ray diffraction method is less than 3.37 angstroms, and the size (Lc) of crystallite in a C-axis direction is at least 1000 angstroms or more, (2) R value, that is the peak intensity ratio of 1360 cm⁻¹ in relation to the peak intensity of 1580 cm⁻¹ in the argon ion laser Raman spectrum, is 0.3 or less, and the half width of 1580 cm⁻¹ peak is 24 cm⁻¹ or less, (3) the mean particle size is 10 to 30 microns, and the thickness of the thinnest portion is at least 3 microns or more and not exceeding the mean particle size, (4) the specific surface area by BET method is 3.5 m²/g or more and not exceeding 10.0 m²/g, (5) the tapping density is 0.5 g/cc or more and not exceeding 1.0 g/cc, and (6) the X-ray diffraction peak intensity ratio of (110)/(004) by wide angle X-ray diffraction method is 0.015 or more, whereby characteristics of the lithium ion secondary cell are improved, and a high energy density is achieved.

In order to obtain graphite particles having the above characteristics, natural or artificial graphite particles of high purity and crystallinity, which are initially in a flaky or scaly form, are ground to round off the corners. Thereafter, these graphite particles are sifted to gather only the particles which are substantially spherical. In this way graphite particles are obtained having a specific surface area that is not excessively large, and exhibiting a tapping density of 0.5 g/cc, or more.

Preferably, these graphite particles have an X-ray diffraction peak intensity ratio of (110)/(004), of 0.015, or more, as determined by wide angle X-ray diffraction. In addition, these graphite particles should be spherical, with a mean roundness of 0.940 or more. The "mean roundness" is defined as the ratio of the peripheral length of a circle corresponding to the particle area, as the numerator, over the circumference of the projected particle image as the denominator. The ratio approaches 1 as the projected particle image approaches a true circle, and becomes smaller when the particle image is slender or ragged. By way of example, after grinding and chamfering the graphite particles into disk or tablet form the graphite may be further sifted by further pulverizing the flaky graphite particles in a fluid energy grinder, but the method of preparation is not particularly limited as long as the graphite particles having the characteristics (1) to (6) are obtained.

The mean particle size of the graphite powder is preferably 10 to 30 microns, more preferably 12 to 26 microns, and most preferably 15 to 23 microns. It is further preferred that the content of the powder with a particle size of less than 10 microns is 20% or less, preferably 10% or less, or alternatively the content of the powder with a particle size exceeding 25 microns is 20% or less, preferably 10% or less. It is most preferred that the respective contents of the powder with a particle size of less than 10 microns and the powder with a particle size of more than 25 microns are both 20% or less, preferably 10% or less and 20% or less, respectively, or most preferably both 10% or less. The powder of which specific surface area by BET method is within a range of 3.5 to 10.0 m²/g may be used, but it should preferably be 4.0 to 8.0 m²/g, and most preferably 4.0 to 7.0 m²/g.

The theoretical value of capacity per 1 g of carbon by reference to $C_6Li$ of interlayer compound produced by intercalation of lithium ion is 372 mAh, and the graphite particles that have thus been selected should preferably have a specific capacity of 330 mAh/g or more, more preferably 350 mAh/g or more, according to measurement of electric capacity using a half cell having lithium metal pair electrodes with the charge and discharge rate at 0.2 mA/cm², that is, the closer its specific capacity is to the above theoretical capacity, the more preferably such graphite powder will be used.

Carbon precursors described herein are those organic substances suitable as a source of carbon in the processes of the invention. Thus, particles of graphite powder are coated with a carbon precursor, and the coated particles are then fired under conditions that carbonize the coating. The result is a carbonaceous powder, the particles of which have as their "nuclei" the above-described graphite particles. The carbon precursors usable in the present invention can be classified into two groups; those wherein carbonization proceeds in liquid phase, and those wherein carbonization proceeds in solid phase.

Liquid phase carbon precursors can include the following, coal derived heavy oil such as coal tar pitch, ranging from soft pitch to hard pitch, as well as coal liquefied oil. Liquid phase carbon precursors also include petroleum derived heavy oil including straight heavy oil such as asphaltene, and cracked heavy oil such as naphtha tar obtained as byproduct of thermal cracking of crude oil or naphtha, and heat treatment pitch such as ethylene tar pitch, FCC decanted oil and Ashland pitch obtained by heat treatment of cracked heavy oil. Further examples of liquid phase carbon precursors include vinyl derivative high polymer, such as polyvinyl chloride, polyvinyl acetate, polyvinyl butyral and polyvinyl alcohol, substituted phenol resin, such as 3-methyl phenol formaldehyde resin and 3,5-dimethyl phenol formaldehyde resin, aromatic hydrocarbon such as asenaphthylene, decacyclene and anthracene, nitrogen cyclic compound such as phenadine and acrydine, and sulfur cyclic compound such as thiophene.

Carbon precursors for solid phase carbon formation include, solid phase, natural high polymer such as cellulose, chain vinyl resin such as polyvinylidene chloride and polyacrylonitrile, aromatic polymer such as polyphenylene, thermosetting resin such as furfuryl alcohol resin, phenol formaldehyde resin and imide resin, and thermosetting resin material such as furfuryl alcohol may be used. These organic substances may be used and applied on the surface of graphite particle nuclei as required, by dissolving and diluting them in a compatible solvent.

In the present invention, normally, the mixture of such graphite particle nucleus and carbon precursor is heated to obtain an intermediate substance, which is then carbonized, fired, and ground, thereby finally obtaining a carbonaceous powder of plural-layer structure in which a surface layer of carbonaceous matter is formed on the surface of the graphite particle nucleus, wherein the ratio of the carbonaceous matter in the carbonaceous powder of plural-layer structure is adjusted to be 0.1 wt % or more and not exceeding 50 wt %, preferably 0.5 wt % or more and not exceeding 25 wt %, even more preferably 1 wt % or more and not exceeding 15 wt %, and most preferably 2 wt % or more and not exceeding 10 wt %.

Meanwhile, the manufacturing process for obtaining such plural-layer carbonaceous matter of the present invention can be divided into the following four steps.

First step:

A step of obtaining a mixture of graphite particles, a carbon precursor, and, if necessary, a solvent, by mixing them with the use of various commercial mixing machines or kneading machines.

Second step:

A step of obtaining an intermediate substance by heating the above said mixture while stirring same as required, thereby removing the solvent.

Third step:

A step of obtaining a carbonaceous substance by heating the above said mixture or intermediate substance in an inert gas atmosphere such as nitrogen gas, carbon dioxide, or argon gas, at a temperature of 700° C. or more and 2800° C. or less.

Fourth step:

A step of processing the above said carbonaceous substance into a powder, by grinding, crushing, sorting or other processing, as required.

Of these steps, the second and fourth steps can be omitted depending on cases, and the fourth step may be carried out before the third step.

Further, as the heating treatment condition in the third step, the thermal history temperature condition is essential. The lower limit temperature varies depending on the type of the carbon precursor and its thermal history, but it is normally 700° C. or more, and preferably 9000° C. or more. On the other hand, the upper limit temperature can be basically raised to a temperature at which the structural order of the carbon precursor does not exceed the crystal structure of the graphite particle nucleus. Therefore, the upper limit temperature of heat treatment is usually 2800° C. or less, preferably 2000° C. or less, or more preferably 1500° C. or less. Under such heating treatment condition, the heating speed, cooling speed, and heat treatment duration can be freely set depending on purposes. It is also possible to increase the temperature to a predetermined temperature after conducting heat treatment in a relatively low temperature region. The reaction machine used in the process may be of either batch type or continuous type, and either one or plural units may be used.

In the carbonaceous powder material of plural-layer structure of the present invention thus forming therein the surface layer of carbonaceous matter, the peak intensity ratio or the R value by Raman spectrum analysis, and the values of d002 and Lc obtained in the diffraction diagram of X-ray wide angle diffraction are preferred not to exceed the degree of crystallinity of the graphite material forming the nucleus; that is, the R value should be more than that of the nucleus, the half width Δv should be more than that of the nucleus, the d002 value should be more than that of the nucleus, and the Lc should not exceed that of the nucleus. To be concrete, the R value of the carbonaceous powder material of plural-layer structure should be 0.01 or more and not exceeding 1.0, preferably 0.05 or more and not exceeding 0.8, more preferably 0.1 or more and not exceeding 0.6, and even more preferably 0.2 or more and not exceeding 0.4, and also more than that of the nucleus. The mean particle size is preferred to be 11 to 40 microns, and more preferably 13 to 30 microns, and most preferably 16 to 25 microns. Even more preferably, the content of a powder with a particle size of less than 10 microns should be 20% or less, preferably 10% or less, or the content of a powder with a particle size exceeding 25 microns should be 20% or less, preferably 10% or less. Moreover, the contents of a powder with a particle size of less than 10 microns and a powder with a particle size exceeding 25 microns should preferably be both 20% or less, more preferably 10% or less and 20% or less, respectively, and most preferably both 10% or less. The mean value of the thickness of the thinnest portion of particle should be 4 microns or more and not exceeding the mean particle size. Further, the specific surface area by BET method should be 1.0 to 5.0 $m^2/g$, more preferably 1.5 to 4.0 $m^2/g$, and even more preferably 2.0 to 3.5 $m_2/g$. Although the tapping density of the carbonaceous powder material of plural-layer structure is further increased as compared with that of the graphite material used as the nucleus owing to carbon coating, it is preferred to be controlled within a range of 0.7 to 1.2 g/cc. The carbonaceous powder defined within such ranges is mixed with a binder and other additives, which is coated or pressed on a current collector made of copper, nickel or the like, so as to be used as an electrode. Then, the density of the active material layer on the electrode (hereinafter referred to as plate density) is adjusted by a rolling process with a flat press or a roll press. At this time, by setting the plate density more than 1.2 and less than 1.6, preferably 1.3 or more and not exceeding 1.5, the capacity per unit volume of battery can be obtained to the maximum extent without lowering the battery capacity in low temperature discharge or high rate discharge. In a battery that is constituted by combining a thus formed negative electrode and an ordinary positive electrode of metal chalcogenide derivative for lithium ion cell, a high voltage of 4V class is realized, the capacity is large, the irreversible capacity recognized in the initial cycle is small, the storage property and reliability of battery when left at a high temperature are increased, and the high rate discharge characteristic and discharge characteristic at low temperature are extremely excellent. In this case, the chalcogenide derivative positive electrode is preferably $LixMO_2$ (M is one or more transition metal, x=0 to 1.2), and, in particular, $LixCoO_2$, $LixNiO_2$, $LixMn_2O_4$, and those having part of Co, Ni, Mn replaced with an element of other transition metal or the like.

In the present invention, the electrolyte solution is not particularly limited to a specific type, but the solvent of the electrolyte solution used in the battery composed of the aforesaid 4V class positive electrode and the negative electrode of the present invention is preferred to be mainly composed of a mixed solvent of one kind or more of cyclic carbonate such as ethylene carbonate, propylene carbonate and butylene carbonate that are excellent in oxidation resistance and low temperature characteristic, and one kind or more of chain carbonate such as dimethyl carbonate, diethyl carbonate and ethyl methyl carbonate. Other solvents, such as aliphatic ester carboxylate or ethers may be also mixed as required. The mixing ratio by volume of cyclic carbonate and of chain carbonate in relation to the entire solvent should be within the range of 5 to 50% and 10 to 90%, respectively, and more preferably 15 to 40% and 20 to 80%, respectively.

Incidentally, in case of using a material of relatively low potential of 3 V class or the like for the positive electrode, solvents other than those mentioned above may be also used.

Lithium salt is used as the solute for such solvents. Well-known examples of lithium salt include $LiClO_4$, $LiBF_4$, $LiPF_6$, $LiAlCl_4$, $LiSbF_6$, $LiSCN$, $LiCl$, $LiCF_3SO_3$, $LiCF_3CO_2$, $Li(CF_3SO_2)_2$, $LiAsF_6$, $LiN(CF_3SO_2)_2$, etc.

No restrictions are placed on selection of members necessary for constituting the battery other than those mentioned above.

A battery incorporating a negative electrode formed to include the carbonaceous powder material of the invention exhibits enhanced high rate charge and discharge performances at both normal temperatures and at low temperatures, relative to a battery that differs only in incorporating a negative electrode formed with conventional graphite powder, without the carbonaceous powder material of the invention.

(Embodiments)

Referring now to the drawings and tables, preferred embodiments of the present invention will be hereinafter described in detail.

(Measuring methods)

(1) Mean particle size by reference to volume

About 1 cc of 2 vol % aqueous solution of polyoxyethylene (20) sorbitan monolaurate was premixed as a surface active agent in the carbonaceous powder, and then using ion exchange water as a dispersant, the mean particle size by reference to volume (median diameter) was measured by means of laser diffraction type particle size distribution meter LA-700 of Horiba.

(2) Tapping density

Using a sieve of 300-micron opening size for passing samples, the powder was dropped in a 20 cc tapping cell until it is filled up, tapping was repeated with a stroke length of 10 mm by 1000 times, and the tapping density was measured by means of powder density measuring instrument Tap Denser KYT-3000 of Seishin Kigyosha.

(3) Measurement of specific surface area by BET

After heating to 350° C. as preliminary drying and passing nitrogen gas for 15 minutes, the specific surface area was measured by BET one-point method at relative pressure of 0.3 by nitrogen gas adsorption using AMS-8000 of Okura Riken.

(4) X-ray diffraction

An X-ray standard high purity silicon powder of about 15% in relation to the sample was admixed in the sample, with which the sample cell was filled up, and wide angle X-ray diffraction curve was measured by reflection type diffractometer method, using CuK α ray made monochromatic by graphite monochromator as the source. From the wide angle X-ray diffraction curve obtained by the measurement, the plane interval (d002) of (002) plane and crystallite size (Lc) in the C-axis direction were measured according to the method recommended by Japan Society for the Promotion of Science.

(5) Raman measurement

In Raman spectrum analysis using argon ion laser beam with wavelength of 514.5 nm, intensity IA of peak PA near 1580 $cm^{-1}$, and intensity IB of peak PB in a range of 1360 $cm^{-1}$ were measured, using NR-1800 of Nippon Bunko, and the intensity ratio R=IB/IA was calculated. At the same time, the half width of the peak PA near 1580 $cm^{-1}$ was determined in the unit of wave number ($cm^{-1}$). In preparation of the samples, the powder was naturally dropped to fill up the cell, and measurement was made while a laser beam is emitted to the sample surface in the cell and the cell was rotated within a plane vertical to the laser beam.

(6) Mean thickness of thinnest portion of carbon powder

Each of the sample graphite powder materials was pressed and formed using a die, and the formed materials were cut in parallel to the pressing direction. The mean thickness of carbon powder was determined from an SEM image of this sectional plane of the formed materials. Specifically, the value of the thinnest portion of carbon powder in the thickness direction was measured in more than 100 pieces, and the mean was determined.

(7) Measurement of X-ray peak intensity ratio of (110)/(004).

The X-ray peak intensity ratio of (110)/(004) was obtained such that the carbon powder was pressed with a die to form pellets of density of about 1.7 g/cc, the peak intensity ratio of (110)/(004) obtained by wide angle X-ray diffraction measurement was calculated, and the mean was determined. Diffraction beams on the (004) plane and (110) plane are diffraction beams on six-carbon ring reticular plane and its vertical plane of graphite crystal. When there are many particles of flaky shape, graphite particles are oriented selectively in the direction parallel to the pressing plane when they are formed into pellets, as compared with cases when there are many graphite particles of disk or tablet shape. Therefore, when the ratio of flaky particles increases in relation to the disk or tablet-like graphite particles, the X-ray peak intensity ratio of (110)/(004) decreases.

(8) Measurement of mean roundness

Using flow type particle image analyzer FPIA-1000 of Toa Medical Electronics, images of graphite particles dispersed in water were taken by a CCD camera in every 1/30 second, and the particle images were analyzed in real time, by which the mean roundness of all particles was calculated. The dispersant was ion exchange water, and the surface active agent was polyoxyethylene (20) sorbitan monolaurate. The mean roundness is the ratio of the peripheral length of a circle corresponding to the area of a projected particle image as the numerator to the peripheral length of the projected particle image as the denominator, and it becomes closer to 1 when the particle image is closer to true roundness, and the value becomes smaller as the particle image is slender or rugged.

(Basic experiment 1)

FIG. 1 is a sectional view of a coin type cell for measuring the reversible capacity and irreversible capacity of the negative electrode of a lithium ion secondary cell. In FIG. 1, a grid 3 of stainless steel expanded metal is preliminarily spot-welded to the inner bottom of a stainless steel cell case 1, and this grid 3 and a compound mainly composed of the carbon powder for negative electrode of lithium ion secondary cell are integrally fixed as a carbon electrode 5 by an internal forming method. The compound of the carbon electrode 5 is a mixture of a sample carbon powder and an acrylic binder at a ratio of 100:5 by weight. A polypropylene gasket 7 is fitted to the brim of a stainless steel lid 2, and metal lithium 4 is pressed to the inner surface of the lid 2. After injecting and impregnating nonaqueous electrolyte to the carbon electrode 5, the lid 2 with the gasket 7 is coupled to the cell case 1 through a separator 6 of micro-porous polyethylene film, and the upper edge opening of the cell case 1 is curled inwardly and sealed. As the nonaqueous electrolyte, an organic electrode prepared by mixing ethylene carbonate and diethyl carbonate at a ratio of 1:1 by volume, and dissolving lithium hexafluorophosphate in this mixed solvent at a concentration of 1 mol/liter was employed. Cells were fabricated using 14 kinds of sample carbon powder in the carbon electrode 5, and using the carbon electrode 5 as the positive electrode and the metal lithium electrode 4 as the negative electrode, charging and discharging were repeated at constant current of current density of 0.3 mA/cm$^2$ at 20° C. After intercalating lithium in carbon until the cell voltage becomes 0 V, lithium is deintercalated from carbon until the cell voltage is 1.0 V, and the determined capacity is the reversible capacity. By subtracting the reversible capacity from the quantity of electricity required for intercalation, the irreversible capacity is obtained. The charge and discharge end voltages of these test cells nearly correspond to the charge end voltage of 4.20 V and discharge end voltage of 2.75 V of a commercial cell of carbon negative electrode and $LiCoO_2$ positive electrode.

Flaky artificial and natural graphite powder obtained by a conventional grinding method, artificial and natural graphite powder of which tapping density has been enhanced by various grinding methods (sample Nos. 1 to 15), and as comparative samples, spherical meso-carbon micro-beads (MCMB, sample No. 16) that are obtained by graphitizing meso-carbon micro-beads as disclosed in Japanese Laid-open Patent No. 7-134988, and petroleum pitch coke powder (sample No. 17) are prepared as sample carbon powder materials for negative electrode, properties of these sample powder materials and the reversible capacity and irreversible capacity mentioned above are summarized in Table 1.

TABLE 1

| | | | | | | | | Powder properties | | | | | | Electric characteristics | |
|---|---|---|---|---|---|---|---|---|---|---|---|---|---|---|---|
| Sample No. | Material | Manufacturer | Trade-name | d002 (Å) | Lc (Å) | Raman R value | Raman half width (cm$^{-1}$) | Mean particle size ($\mu$m) | Specific surface area (m$^2$/g) | Mean thickness of thinnest portion ($\mu$m) | Tapping density (g/cc) | Mean roundness | (110)/(004) | Reversible capacity (mAh/g) | Irreversible capacity (mAh/g) |
| 1 | Artificial graphite | Timcal | KS15 | 3.36 | 1000 or more | 0.16 | 21.1 | 7.8 | 14.5 | 1.1 | 0.32 | 0.928 | 0.008 | 351 | 53 |
| 2 | Artificial graphite | Timcal | KS25 | 3.36 | 1000 or more | 0.16 | 21.4 | 10.1 | 11.9 | 1.3 | 0.40 | 0.925 | 0.009 | 353 | 43 |
| 3 | Artificial graphite | Timcal | KS44 | 3.36 | 1000 or more | 0.15 | 22.2 | 18.8 | 9.3 | 1.8 | 0.41 | 0.919 | 0.010 | 359 | 36 |
| 4 | Artificial graphite | Timcal | KS75 | 3.36 | 1000 or more | 0.15 | 22.2 | 23.7 | 7.2 | 2.1 | 0.44 | 0.918 | 0.011 | 353 | 35 |
| 5 | Artificial graphite | Nippon graphite | SP-10 | 3.35 | 1000 or more | 0.18 | 21.2 | 32.5 | 6.9 | 2.4 | 0.41 | 0.927 | 0.012 | 353 | 32 |
| 6 | Artificial graphite | Nippon graphite | SP-20 | 3.36 | 1000 or more | 0.15 | 24.0 | 14.9 | 8.7 | 1.8 | 0.23 | 0.937 | 0.010 | 356 | 40 |
| 7 | Natural graphite | SEC | SNO10 | 3.35 | 1000 or more | 0.19 | 20.9 | 10.4 | 8.7 | 2.0 | 0.46 | 0.919 | 0.008 | 362 | 39 |
| 8 | Natural graphite | SEC | SNO15 | 3.35 | 1000 or more | 0.17 | 21.5 | 12.9 | 7.8 | 2.3 | 0.46 | 0.927 | 0.009 | 361 | 35 |

TABLE 1-continued

| | | | | | | | Powder properties | | | | | | Electric characteristics | |
|---|---|---|---|---|---|---|---|---|---|---|---|---|---|---|
| | | | | | | | | | Mean | | | | | |
| Sample No. | Material | Manufacturer | Trade-name | d002 (Å) | Lc (Å) | Raman R value | Raman half width (cm⁻¹) | Mean particle size (μm) | Specific surface area (m²/g) | thickness of thinnest portion (μm) | Tapping density (g/cc) | Mean roundness | (110)/(004) | Reversible capacity (mAh/g) | Irreversible capacity (mAh/g) |
|---|---|---|---|---|---|---|---|---|---|---|---|---|---|---|---|
| 9 | Natural graphite | SEC | SNO20 | 3.36 | 1000 or more | 0.16 | 21.6 | 18.7 | 6.8 | 2.5 | 0.48 | 0.930 | 0.009 | 358 | 34 |
| 10 | Natural graphite | Nippon graphite | ACP-20NB | 3.36 | 1000 or more | 0.18 | 21.6 | 19.0 | 4.9 | 5.4 | 0.64 | 0.947 | 0.038 | 354 | 23 |
| 11 | Natural graphite | Nippon graphite | ASP-20NB | 3.36 | 1000 or more | 0.17 | 21.1 | 16.7 | 4.9 | 6.3 | 0.66 | 0.943 | 0.039 | 357 | 20 |
| 12 | Artificial graphite | Nippon graphite | SP-20NB | 3.36 | 1000 or more | 0.20 | 20.9 | 15.7 | 6.6 | 3.5 | 0.61 | 0.942 | 0.032 | 360 | 26 |
| 13 | Natural graphite | Chuetsu graphite | H-0 | 3.36 | 1000 or more | 0.21 | 22.0 | 22.3 | 5.6 | 5.6 | 0.65 | 0.940 | 0.035 | 358 | 24 |
| 14 | Natural graphite | Chuetsu graphite | H-1 | 3.36 | 1000 or more | 0.18 | 21.8 | 18.4 | 5.8 | 6.5 | 0.79 | 0.941 | 0.038 | 355 | 24 |
| 15 | Natural graphite | Chuetsu graphite | H-2 | 3.36 | 1000 or more | 0.24 | 22.1 | 17.7 | 6.4 | 5.8 | 0.70 | 0.940 | 0.039 | 356 | 26 |
| 16 | Artificial graphite | Osaka Gas | MCMB | 3.37 | 700 | 0.19 | 25.4 | 5.3 | 2.9 | 5.3 | 1.10 | 0.966 | 0.120 | 295 | 18 |
| 17 | Artificial graphite | Nippon graphite | GMW-20NB | 3.37 | 750 | 0.32 | 25.0 | 17.2 | 5.3 | 8.1 | 0.95 | 0.961 | 0.110 | 298 | 27 |

As can be seen from Table 1, the cells with the spherical graphite powder (sample No. 16) and the coke powder (sample No. 17) in comparative samples with Lc of less than 1000 angstroms had relatively small irreversible capacities, but the reversible capacities which greatly influence the energy density were small (both less than 300 mAh/g). In contrast, all of the cells with the sample Nos. 1 to 15 made of natural graphite or artificial graphite powder had the reversible capacity of at least 350 mAh/g, which was close to the theoretical value of specific capacity (372 mAh/g). Among them, it is noted that the irreversible capacities of the cells with the sample graphite powder Nos. 10 to 15 are 20 to 26 mAh/g, that are smaller as compared to those of the cells with other sample graphite powder (Nos. 1 to 9).

It is understood that a high level reversible capacity is obtained by using natural graphite or artificial graphite of high degree of crystallinity and purity with the plane interval (d002) of (002) plane being less than 3.37 angstroms by wide angle X-ray diffraction and the crystallite size (Lc) in the C-axis direction being at least 1000 angstroms or more, in the negative electrode material of lithium ion secondary cell, as the preliminary conditions of the present invention. (Basic experiment 2)

Using the same carbon powder materials for negative electrode (sample Nos. 1 to 17) of which reversible capacity and irreversible capacity were determined in the basic experiment 1, cylindrical cells were fabricated, and the high rate discharge characteristic at a low temperature and electrolyte leak possibility when left at a high temperature in a charged state were investigated.

Figure 2:
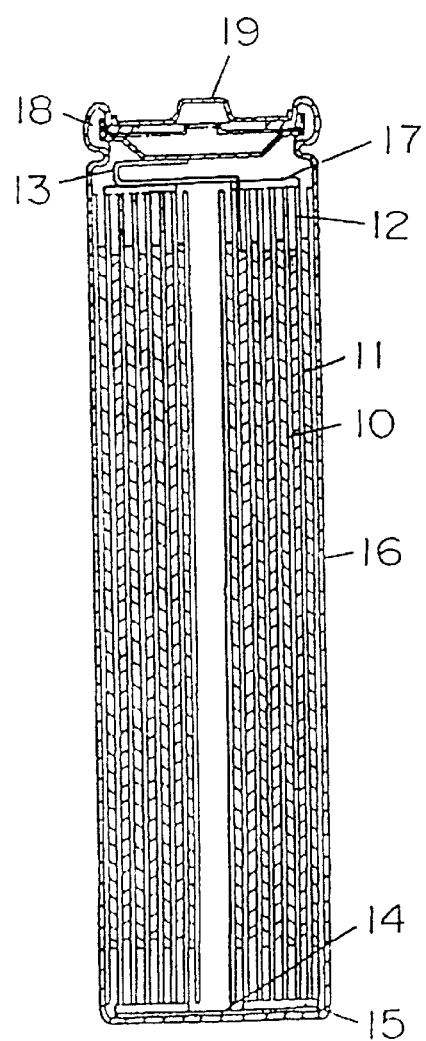
FIG. 2 is a sectional view of a cylindrical cell in a vortex electrode group constitution according to an embodiment of the present invention.

FIG. 2 is a sectional view of a cylindrical cell of spiral electrode group configuration. In FIG. 2, a band-like positive electrode 10 and a negative electrode 11 are spirally wound with a separator 12 made of micro-porous polyethylene film interposed therebetween, thereby constituting an electrode group. The positive electrode 10 is prepared by mixing $LiCoO_2$ which is a composite oxide of lithium and cobalt of active materials, carbon black as conductive material, and poiytetrafilioroethylene (PTFE) as a binder at a ratio of 100:3:10 by weight, applying this paste on both sides of an aluminum foil used as a current collector, drying and pressing it by a roll, and cutting it to a prescribed size. A dispersion solution was used for the PTFE as the binder. A positive electrode lead piece 13 is spot-welded to the aluminum foil of the positive electrode 10. The negative electrode 11 is prepared by applying a paste, that is obtained by admixing an acrylic binder solution into the sample carbon powder, on both sides of a copper foil used as a current collector, drying and pressing it by a roll, and cutting it to a specified size. A negative electrode lead piece 14 is spot-welded to the copper foil of the negative electrode 11. A bottom insulator 15 is mounted on the lower side of the wound electrode group, which is then put into a cell case 16 made of a nickel plated steel plate, and the negative electrode lead piece 14 is spot-welded to the inner bottom of the cell case 16. Then, after placing an upper insulator 17 on the electrode group, a groove is cut in a prescribed position at the opening of the cell case 16, and a predetermined amount of organic electrolyte is injected thereinto and impregnated. As the organic electrolyte, the same kind as used in the basic experiment 1 was used. Afterwards, the positive electrode lead piece 13 is spot-welded to the inner bottom of a seal plate 19 to which a gasket 18 has been fitted at its peripheral edge. The seal plate 19 is then fitted to the opening of the cell case 16 through the gasket 18, and the upper edge of the cell case 16 is curled inwardly and sealed, thereby completing a cell.

The discharge capacity of each cell was set such as to be defined by the negative electrode capacity, and the weight of carbon powder for negative electrode of each cell was made identical regardless of the kind. The amount of other materials and manufacturing method were made identical, so that the comparison could be made with respect to the carbon powder materials for negative electrode.

All the cells, five cells each for cells A to Q, that are respectively made of 17 kinds of carbon powder for negative electrode, were charged at 20° C. at a constant current of 100 mA (1/5C) until the terminal voltage of each cell became 4.2 V, after which they were discharged at a constant current of 100 mA (1/5C) until 2.75V, and the 1/5C discharge capacity was determined. Then, after charging the cells in a similar manner, they were discharged at a constant current of 500 mA (1C) until 2.75V, and the 1C discharge capacity was determined. Successively, the cells were charged at 20° C., after which they were left at −20° C. for 24 hours, and the 1C discharge capacity was determined at the same temperature of −20° C. Further, after letting each of the cells stand at 20° C., when the temperature of the cells had returned to 20° C., they were charged in a similar manner, and then the cells were left at 100° C. for one day, and after the cell temperature had returned to 20° C., all cells were observed for presence or absence of electrolyte leak.

The above mentioned battery performances (mean of five cells) are summarized in Table 2 in contrast to the properties of the sample carbon powder.

and discharge conditions as those described with respect to the basic experiment 2, and the result was such that they exhibited only 70 to 80% of the 1/5C discharge capacity as compared to that before being left at a high temperature. These cells were completely free from electrolyte leak accident when left at the high temperature, and thus on one hand the reliability of the cells was enhanced but on the other hand deterioration of battery characteristics was significant, wherefore it is necessary to minimize the deterioration of battery characteristics even in the cases where they are left at high temperatures.

Accordingly, a series of carbonaceous powders according to the invention were prepared for testing by the above described methods. Graphite powder materials (controls), as described above by basic experiment 2, Table 1 and Table 2,

TABLE 2

| | | | | | Battery performance | | | |
|---|---|---|---|---|---|---|---|---|
| Sample No. | Material | Manufacturer | Tradename | Cell symbol | 1/5C Discharge capacity | 1C Discharge capacity | −20° C. 1C Discharge capacity | Number of electrolyte leak after being left at high temperature |
| 1 | Artificial graphite | Timcal | KS15 | A | 511 | 501 | 450 | 5/5 |
| 2 | Artificial graphite | Timcal | KS25 | B | 532 | 523 | 452 | 3/5 |
| 3 | Artificial graphite | Timcal | KS44 | C | 539 | 521 | 410 | 2/5 |
| 4 | Artificial graphite | Timcal | KS75 | D | 549 | 508 | 357 | 0/5 |
| 5 | Artificial graphite | Nippon graphite | SP-10 | E | 537 | 483 | 267 | 1/5 |
| 6 | Artificial graphite | Nippon graphite | SP-20 | F | 541 | 528 | 433 | 2/5 |
| 7 | Natural graphite | SEC | SNO10 | G | 538 | 522 | 473 | 3/5 |
| 8 | Natural graphite | SEC | SNO15 | H | 545 | 531 | 452 | 2/5 |
| 9 | Natural graphite | SEC | SNO20 | I | 536 | 520 | 407 | 1/5 |
| 10 | Natural graphite | Nippon graphite | ACP-20NB | J | 554 | 543 | 421 | 0/5 |
| 11 | Natural graphite | Nippon graphite | ASP-20NB | K | 561 | 550 | 445 | 0/5 |
| 12 | Artificial graphite | Nippon graphite | SP-20NB | L | 557 | 546 | 440 | 0/5 |
| 13 | Natural graphite | Chuetsu graphite | H-0 | M | 553 | 541 | 420 | 0/5 |
| 14 | Natural graphite | Chuetsu graphite | H-1 | N | 554 | 545 | 440 | 0/5 |
| 15 | Natural graphite | Chuetsu graphite | H-2 | O | 560 | 548 | 445 | 0/5 |
| 16 | Artificial graphite | Osaka gas | MCMB | P | 478 | 463 | 417 | 0/5 |
| 17 | Artificial graphite | Nippon graphite | GMW-20NB | Q | 483 | 468 | 372 | 0/5 |

As can be seen from Table 2, the cells with sample Nos. 16 and 17 which had small reversible capacities as shown in Table 1, have small 1/5C and 1C discharge capacities at 20° C., while those of the cells with sample graphite powder Nos. 1 to 15 are relatively large. However, of sample Nos. 1 to 15, those which exhibited high rate discharge capacities at low temperature (−20° C., 1C) of 400 mA or more were cells A, B, C, F, G, H, I, J, K, L, M, N, and O, that were respectively made of the sample graphite powder Nos. 1, 2, 3, 6, 7, 8, 9, 10, 11, 12, 13, 14, and 15. Further, those which were completely free from electrolyte leak after being left at a high temperature were the cells D, J, K, L, M, N, O, P, and Q, that were respectively made of the sample graphite powder Nos. 4, 10, 11, 12, 13, 14, 15, 16 and 17. From these results, it is seen that those which were excellent in all aspects of battery performances were the cells J, K, L, M, N and O, that were respectively made of the sample graphite powder Nos. 10, 11, 12, 13, 14, and 15.
(Embodiments and comparative examples)

Among the cells of which 1/5C discharge capacity, 1C discharge capacity, 1C discharge capacity at −20° C., and electrolyte leak possibility after being left at a high temperature were measured in the basic experiment 2, the cells J, K, L, M, N and O respectively made of sample graphite powder Nos. 10, 11, 12, 13, 14, and 15, that were excellent in all aspects of battery performances, were left at a high temperature, after which their respective 1/5C discharge capacities at 20° C. were determined under the same charge as sample numbers 1–17, were processed to form carbonaceous powder as experimental sample numbers 18–34. The carbonaceous powder for sample numbers 18–34 were prepared using petroleum tar pitch as the carbon precursor. Petroleum tar pitch is obtained from naphtha cracking. After the coating process, the coated carbon powder materials were fired in a flow of inert gas, reaching a final temperature of 1200° C. Then, after being cooled to a room temperature, the carbon powder materials were crushed with a grinder to obtain carbon composite (carbonaceous) powders with a specific particle size distribution. The resulting carbonaceous powder had a carbonaceous coating of 5 wt %. Samples 18 through 34 were then used to prepare a series of negative electrodes by the methods described above for basic experiment 2. The respective negative electrodes were, in turn, used to prepare secondary nonaqeous electrolyte cells for testing.

Five cells each for cells R to AH were respectively fabricated in a similar manner as in the basic experiment 2, except 17 kinds of carbon powder for negative electrode were used, the same battery performances were measured, and in addition, the 1/5C discharge capacities of the cells that were free from electrolyte leak after being left at a high temperature were measured.

The battery performances mentioned above are summarized in Table 3 in contrast with the properties of the sample carbon powder.

TABLE 3

| | | | | | Powder properties | | | | | Battery performance | | | | |
|---|---|---|---|---|---|---|---|---|---|---|---|---|---|---|
| Sample No. | Nucleus sample No. | Material | Manufacturer | Trade-name | Mean particle size (μm) | Specific surface area (m²/g) | Mean thickness of thinnest portion (μm) | Tapping density (g/cc) | Cell Symbol | 1/5C Discharge capacity (mAh) | 1C Discharge capacity (mAh) | −20° C. 1C Discharge capacity (mAh) | Number of electrolyte leak after being left at high temperature | 1/5C Discharge capacity after being left at high temperature (mAh) | 1/5C Discharge capacity ratio before and after being left at high temperature (%) |
| 18 | 1 | Artificial graphite | Timcal | KS15 | 12.0 | 4.9 | 1.9 | 0.47 | R | 520 | 513 | 448 | 4/5 | — | — |
| 19 | 2 | Artificial graphite | " | KS25 | 12.4 | 4.5 | 2.4 | 0.57 | S | 542 | 530 | 454 | 2/5 | — | — |
| 20 | 3 | Artificial graphite | " | KS44 | 17.7 | 4.2 | 2.6 | 0.61 | T | 549 | 532 | 411 | 1/5 | — | — |
| 21 | 4 | Artificial graphite | " | KS75 | 23.2 | 3.1 | 3.1 | 0.74 | U | 553 | 520 | 357 | 0/5 | 455 | 82.3 |
| 22 | 5 | Artificial graphite | Nippon graphite | SP-10 | 38.8 | 2.5 | 3.3 | 0.62 | V | 547 | 490 | 269 | 1/5 | — | — |
| 23 | 6 | Artificial graphite | Nippon graphite | SP-20 | 22.9 | 4.8 | 2.7 | 0.57 | W | 549 | 535 | 434 | 2/5 | — | — |
| 24 | 7 | Natural graphite | SEC | SNO10 | 18.6 | 4.1 | 3.1 | 0.82 | X | 541 | 530 | 475 | 2/5 | — | — |
| 25 | 8 | Natural graphite | " | SNO15 | 21.4 | 3.7 | 3.2 | 0.81 | Y | 554 | 537 | 452 | 1/5 | — | — |
| 26 | 9 | Natural graphite | " | SNO20 | 25.2 | 2.9 | 3.4 | 0.83 | Z | 542 | 528 | 409 | 1/5 | — | — |
| 27 | 10 | Natural graphite | Nippon graphite | ACP-20NB | 20.2 | 2.6 | 8.1 | 0.81 | AA | 566 | 552 | 423 | 0/5 | 531 | 93.8 |
| 28 | 11 | Natural graphite | Nippon graphite | ASP-20NB | 21.4 | 2.8 | 10.2 | 0.88 | AB | 569 | 559 | 447 | 0/5 | 534 | 93.8 |
| 29 | 12 | Artificial graphite | Nippon graphite | SP-20NB | 21.5 | 2.8 | 4.9 | 0.70 | AC | 567 | 549 | 443 | 0/5 | 532 | 93.8 |
| 30 | 13 | Natural graphite | Chuetsu graphite | H-0 | 24.8 | 2.3 | 7.6 | 0.85 | AD | 560 | 550 | 425 | 0/5 | 530 | 94.6 |
| 31 | 14 | Natural graphite | Chuetsu graphite | H-1 | 24.0 | 2.4 | 10.5 | 0.94 | AE | 561 | 552 | 458 | 0/5 | 532 | 94.8 |
| 32 | 15 | Natural graphite | Chuetsu graphite | H-2 | 21.2 | 2.6 | 8.3 | 0.92 | AF | 563 | 557 | 462 | 0/5 | 537 | 95.4 |
| 33 | 16 | Artificial graphite | Osaka gas | MCMB | 6.5 | 1.8 | 6.1 | 1.26 | AG | 485 | 570 | 415 | 0/5 | 450 | 92.8 |
| 34 | 17 | Artificial graphite | Nippon graphite | GMW-20NB | 17.2 | 1.6 | 8.7 | 1.05 | AH | 487 | 473 | 374 | 0/5 | 452 | 92.8 |

As can be seen from Table 3, no changes were observed in 1/5C discharge capacity, 1C discharge capacity, and 1C discharge capacity at −20° C. as a result of using carbonaceous powder of plural-layer structure. However, in cells R, S, T, V, W, X, Y, and Z respectively made of sample carbonaceous powder of plural-layer structure (Nos. 18, 19, 20, 22, 23, 24, 25, and 26) of which nucleus is sample Nos. 1, 2, 3, 5, 6, 7, 8, and 9, respectively, in which electrolyte leak was found in the basic experiment 2, the number of leaks showed a tendency to decrease, although it was insufficient to prevent electrolyte leak completely. On the other hand, those that were completely free from electrolyte leak after being left at a high temperature were cells U, AA, AB, AC, AD, AE, AF, AG, and AH respectively made of sample carbonaceous powder of plural-layer structure Nos. 21, 27, 28, 29, 30, 31, 32, 33, and 34. In these cells, the 1/5C discharge capacity after being left at a high temperature was 82 to 96% of the 1/5C discharge capacity before being left at the high temperature, which means, the 1/5C discharge capacity after being left at a high temperature was enhanced by using the carbonaceous powder of plural-layer structure. Of these cells, in all of the cells AA, AB, AC, AD, AE, and AF respectively made of the sample carbonaceous powder of plural-layer structure Nos. 27, 28, 29, 30, 31, and 32, the 1/5C discharge capacities after being left at a high temperature were at least 530 mAh or more, that is 93% or more of the 1/5C discharge capacity before being left at the high temperature. It is concluded from these results that those that were excellent in all aspects of battery performances were cells AA, AB, AC, AD, AE, and AF respectively made of sample carbonaceous powder of plural-layer structure Nos. 27, 28, 29, 30, 31, and 32.

Incidentally, the baking temperature for obtaining the carbonaceous powder of plural-layer structure was 1300° C. in the above embodiments, but similar powder properties were achieved in a temperature range of 700 to 2800° C., whereby same effects as in the present invention were confirmed. Also, the carbonaceous powder of plural-layer structure was prepared by mixing the nucleus material and the pitch so that the ratio by weight of the graphite powder used as the nucleus and the carbon matter newly forming a surface layer will be 95:5, but similar properties were obtained with this ratio by weight being within the range of 99:1 to 50:50, whereby same effects as those of the present invention were achieved.

In the above description of the present invention, explanation is made only with respect to the organic electrolyte as the nonaqueous electrolyte, which does not mean that this invention should not be applied to a secondary cell composed of polymer or other cation conductive solid electrolyte in the secondary cell.

INDUSTRIAL APPLICABILITY

As set forth above, the graphite powder for negative electrode according to the present invention achieves the capacity of 354 to 360 mAh/g, that is, at least 95% (95.2 to 96.8%) of the theoretical value of specific capacity (372 mAh/g), while its irreversible capacity is as extremely small as 20 to 26 mAh/g, by which it contributes to enhancement of energy density. Moreover, not only exhibiting excellent high rate charge and discharge performances and low temperature high rate discharge performance, but also it presents a highly reliable lithium secondary cell which is free from electrolyte leakage accidents even left at a high temperature, wherefore it is useful in the fabrication of lithium secondary cells.

What is claimed is:

1. A nonaqueous electrolyte secondary cell comprising a positive electrode, a negative electrode, and a separator interposed therebetween, said negative electrode comprising a negative electrode material that allows lithium ions to reversibly undergo repeated intercalation and deintercalation with each charge and discharge of said nonaqueous electrolyte secondary cell, and wherein said negative electrode material comprises a carbonaceous powder, said carbonaceous powder comprising particles that have a plural-layer structure with a surface layer of carbonaceous matter formed thereon, wherein said carbonaceous matter comprises from 0.1 to 50 wt % of said carbonaceous powder, and said particles have a mean particle size of from 11 to 40 microns, a mean thickness of the thinnest portion of at least 4 microns, provided that the mean thickness of the thinnest portion does not exceed the mean particle size, a specific surface area ranging from 1.0 to 5.0 m$^2$/g, determined by a BET method, wherein said carbonaceous powder has a tapping density ranging from 0.7 g/cc to 1.2 g/cc, and a peak intensity ratio by Raman spectroscopy ranging from 0.01 to 1.0.

2. The nonaqueous electrolyte secondary cell according to claim 1, wherein said carbonaceous powder has a specific surface area ranging from 1.5 to 4.0 m$^2$/g, defined by a BET method.

3. The nonaqueous electrolyte secondary cell according to claim 1, wherein said carbonaceous powder comprises 20% or less of particles having a mean size of less than 10 microns.

4. The nonaqueous electrolyte secondary cell according to claim 1, wherein said carbonaceous powder comprises 20% or less of particles having a mean size of greater than 25 microns.

5. The nonaqueous electrolyte secondary cell according to claim 1, wherein said positive electrode comprises a metal oxide of the formula: Li$_x$MO$_2$, and M is one or more transition metals selected from the group consisting of Co, Ni, Mn, and Fe, and x ranges in value from 0 to 1.2.

6. The nonaqueous electrolyte secondary cell according to claim 1, wherein said carbonaceous powder is prepared by a process of:

(a) coating particles of natural or artificial scaly or flaky graphite powder with a carbon precursor, (b) firing said mixture in an inert gas atmosphere at a temperature ranging from 700 to 2800° C., to form an outer layer of carbonaceous matter on said graphite particles, (c) powdering said fired coated graphite to produce said carbonaceous powder, and wherein said scaly or flaky graphite powder has the following characteristics:

(1) a plane interval (d002) of (002) plane, as measured by wide angle X-ray diffraction, of less than 3.37 Ångstroms, and a size or Lc of crystallite in a C-axis direction is at least 1000 Ångstroms, (2) a ratio of peak intensities of 0.03 or less, measured by argon ion laser Raman spectroscopy as a ratio of peak intensity at 1360 cm$^1$, to peak intensity at 1580 cm$^1$, respectively, and said graphite particles also exhibit a half-width peak intensity at 1580 cm$^1$, of 24 cm$^1$ or less, as measured by argon ion laser Raman spectroscopy, (3) a mean particle size ranging from 10 to 30 microns, and the thickness of the thinnest portion of said graphite particles is at least 3 microns, provided that the mean thickness of the thinnest portion does not exceed the mean particle size, (4) a specific surface area measured by a BET method ranges from 3.5 m$^2$/g to 10.0 m$^2$/g, (5) a tapping density ranging from 0.5 g/cc to 1.0 g/cc, and (6) a wide angle X-ray diffraction peak intensity ratio of (110)/(004) that is at least 0.015.

7. The nonaqueous electrolyte secondary cell according to claim 6, wherein said coating step (a) comprises mixing said graphite powder with said carbon precursor and heating said mixture with stirring.

8. The nonaqueous electrolyte secondary cell according to claim 6, wherein said graphite powder comprises particles having a mean roundness of at least 0.940.

* * * * *